United States Patent [19]

Nishiyama et al.

[11] Patent Number: 5,428,500
[45] Date of Patent: Jun. 27, 1995

[54] SOLID ELECTROLYTIC CAPACITOR

[75] Inventors: Toshihiko Nishiyama; Koji Sakata; Takashi Fukaumi; Atsushi Kobayashi; Satoshi Arai, all of Tokyo, Japan

[73] Assignee: NEC Corporation, Tokyo, Japan

[21] Appl. No.: 339,681

[22] Filed: Nov. 14, 1994

[30] Foreign Application Priority Data

Nov. 18, 1993 [JP] Japan .................. 5-288931

[51] Int. Cl.$^6$ .............................. H01G 9/02
[52] U.S. Cl. ..................... 361/525; 29/25.03
[58] Field of Search ................... 361/523–525, 361/528, 529; 29/25.03; 427/80; 252/500, 511

[56] References Cited

U.S. PATENT DOCUMENTS

| | | | |
|---|---|---|---|
| 4,780,796 | 10/1988 | Fukuda et al. | 361/525 |
| 4,803,596 | 2/1989 | Hellwig et al. | 361/525 |
| 5,120,472 | 6/1992 | Shikatani et al. | 252/500 |

FOREIGN PATENT DOCUMENTS

| | | |
|---|---|---|
| 64-4912 | 1/1989 | Japan . |
| 2-98915 | 4/1990 | Japan . |
| 4-56445 | 9/1992 | Japan . |

Primary Examiner—Bruce A. Reynolds
Assistant Examiner—Michael D. Switzer
Attorney, Agent, or Firm—Sughrue, Mion, Zinn, Macpeak & Seas

[57] ABSTRACT

A solid electrolytic capacitor includes an anode, a dielectric layer, a solid electrolyte layer, and a cathode electrode. The solid electrolyte layer consists of a conductive polymer compound obtained by doping a dopant in one of a copolymer and a mixture of polypyrrole or a derivative thereof, the polypyrrole having a repetition unit represented by a formula

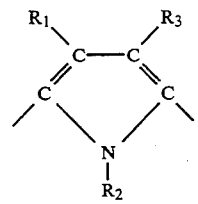

wherein each of $R_1$ to $R_3$ represents an alkyl group or a hydrogen atom, and polyaniline or a derivative thereof, the polyaniline having a repetition unit represented by a formula

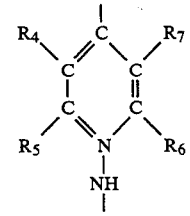

wherein each of $R_4$ to $R_7$ represents an alkyl group or a hydrogen atom.

5 Claims, 1 Drawing Sheet

SOLID ELECTROLYTIC CAPACITOR

BACKGROUND OF THE INVENTION

The present invention relates to a solid electrolytic capacitor and, more particularly, to a solid electrolytic capacitor using a conductive polymer compound as a solid electrolyte.

A tantalum solid electrolytic capacitor is generally constituted by an anode obtained by sintering a tantalum powder, a tantalum oxide coating serving as a dielectric formed on the anode, a solid electrolyte formed on the oxide coating, and a cathode conductor formed on the solid electrolyte.

A conventional capacitor using manganese dioxide as a solid electrolyte is well known. In recent years, for example, as disclosed in Japanese Patent Publication No. 4-56445 (Reference 1), a capacitor using a conductive polymer compound such as polypyrrole in place of manganese dioxide is also proposed. Note that, as cathode conductors, a graphite layer and a silver layer are often used.

A capacitor using a conductive polymer compound as a solid electrolyte has excellent characteristics in a high-frequency range compared with that of a capacitor using manganese dioxide because the conductivity of the conductive polymer compound is several tens times that of manganese dioxide. A capacitor using the conductive polymer compound has received a good deal of attention as a capacitor which copes with an increase in operating frequency of electronic equipment in recent years. Since manganese dioxide is produced by thermally decomposing manganese nitrate, thermal stress at about 200° to 300° C. repeatedly acts on a capacitor element, and defects occur in an oxide coating, thereby disadvantageously increasing a leakage current. In contrast to this, when a conductive polymer compound is used as a solid electrolyte, it is known that a highly reliable product which is free from degradation of an oxide coating can be provided because a capacitor element need not be treated at a high temperature (e.g., Reference 1). As types of conductive polymer compounds, polypyrrole, a derivative thereof (Reference 1 and Japanese Patent Laid-Open No. 64-4912 (Reference 2)), and a five-membered heterocyclic copolymer or a mixture of polypyrrole, polythiophene, and a derivative thereof as disclosed in, e.g., Japanese Patent Laid-Open No. 2-98915 (Reference 3) are used.

Although a solid electrolytic capacitor using a conductive polymer compound has excellent high-frequency characteristics compared with a tantalum solid electrolytic capacitor using only manganese dioxide as a solid electrolyte, the solid electrolytic capacitor using a conductive polymer compound poses several problems because the solid electrolyte consists of a single chemical species. In particular, when the conductive polymer compound is to be used as the solid electrolyte of the electrolytic capacitor, a balance between a conductivity and a heat resistance is important. More specifically, although both polypyrrole and polyaniline are attempted to be applied as the solid electrolytes of solid electrolytic capacitors, polypyrrole generally has a high conductivity and a low heat resistance, but polyaniline generally has a low conductivity and a high, heat resistance. The conductivity directly influences high-frequency characteristics, and the heat resistance influences the application temperature of a capacitor.

In order to solve the above problems, it is proposed to use, as a solid electrolyte, a copolymer or a mixture (for example, a copolymer or mixture of pyrrole, N-methylpyrrole, N-ethylpyrrole, and the like (Reference 1)), having the same basic skeleton. However, the effect of this proposal is not satisfactory. On the other hand, as described above, it is also proposed to use, as a solid electrolyte, as a five-membered heterocyclic copolymer or a mixture of polypyrrole, polythiophene, and derivatives thereof. However, since these constituent elements have no significant difference in heat resistance and conductivity, as described in Reference 3, only the high-frequency characteristics of the capacitor using the above copolymer or mixture as a solid electrolyte are improved compared with those of a capacitor using manganese dioxide as a solid electrolyte.

SUMMARY OF THE INVENTION

It is an object of the present invention to provide a solid electrolytic capacitor having excellent high-frequency characteristics and a high heat resistance.

In order to achieve the above object, according to the present invention, there is provided a solid electrolytic capacitor comprising an anode consisting of a valve metal and having a lead extending therefrom, a dielectric layer constituted by an oxide coating formed by oxidizing a surface of the anode, a solid electrolyte layer formed on the dielectric layer, and a cathode electrode formed on the solid electrolyte layer, wherein the solid electrolyte layer consists of a conductive polymer compound obtained by doping a dopant in one of a copolymer and a mixture of polypyrrole or a derivative thereof, the polypyrrole having a repetition unit represented by a formula

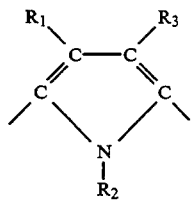

wherein each of $R_1$ to $R_3$ represents an alkyl group or a hydrogen atom, and polyaniline or a derivative thereof, the polyaniline having a repetition unit represented by a formula

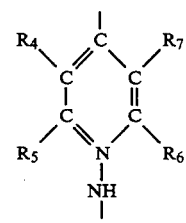

wherein each of $R_4$ to $R_7$ represents an alkyl group or a hydrogen atom.

DESCRIPTION OF THE PREFERRED EMBODIMENT

Examples according to the present invention and comparative examples according to the prior art will be described below in detail.

Figure 1A:
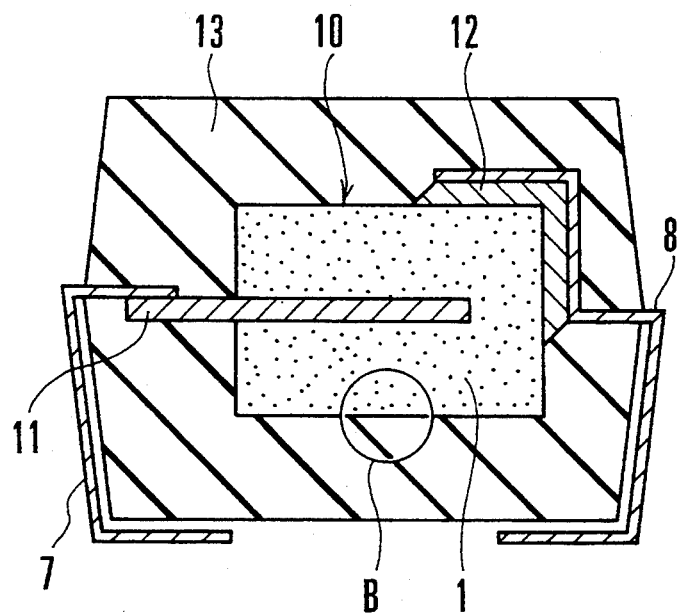
FIG. 1A is a sectional view showing a solid electrolytic capacitor according to an embodiment of the present invention.
Figure 1B:
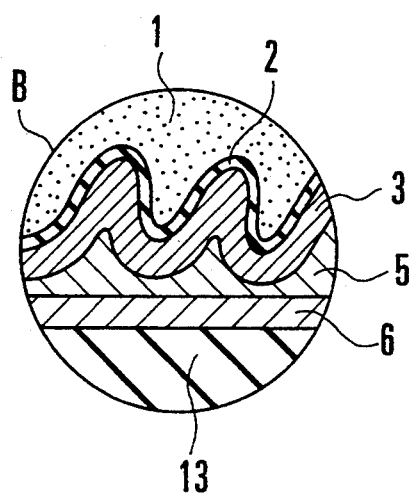
FIG. 1B is an enlarged sectional view showing a main part B of the solid electrolytic capacitor shown in FIG. 1A.

FIG. 1A shows a solid electrolytic capacitor according to an embodiment of the present invention, and FIG. 1B shows a main part B of the solid capacitor in FIG. 1A. Referring to FIG. 1A, reference numeral 10 denotes a chip type capacitor element including an anode 1. One end of an anode lead 7 is welded to a lead 11 externally extending from the capacitor element 10, and one end of a cathode lead 8 is fixed to the surface of the capacitor element 10 with a conductive adhesive 12. Thereafter, the capacitor element 10 is molded with a molding resin 13.

FIG. 1B shows a surface portion B of the capacitor element 10 in FIG. 1A. Referring to FIG. 1B, the surface of the anode 1 consisting of a valve metal and constituting the capacitor element 10 is made considerably uneven to increase the surface area of the anode 1. A dielectric 2 consisting of a metal oxide is formed along the porous wall surface of the anode 1. A solid electrolyte layer 3 which consists of a conductive polymer compound and constitutes the subject matter of the present invention is formed on the surface of the dielectric 2. A cathode electrode 6 constituted by a silver layer is formed on the solid electrolyte layer 3 consisting of the conductive polymer compound. A graphite layer 5 for improving electrical connection may be formed between the cathode electrode 6 and the solid electrolyte layer 3. In this manner, the cathode electrode 6 is formed on the entire surface of the capacitor element 10, and a cathode lead is electrically connected to a portion of the cathode electrode 6 through the conductive adhesive 12.

The embodiment of the present invention will be described below in detail by way of its examples.

EXAMPLE 1

An anode 1 formed by sintering a tantalum powder was anodized in an aqueous phosphoric acid solution to form a dielectric 2, on the surface of the sintered body, constituted by a tantalum oxide coating. Thereafter, the anode 1 was dipped in a pyrrole-aniline solution mixture containing pyrrole, aniline, and ethanol at a weight ratio of 15:15:70. The anode 1 was dipped in an oxidant solution set at a temperature of 15° C. and containing ammonium persulfate, toluenesulfonic acid, dodecylbenzene ferric sulfonate, and ethanol at a weight ratio of 20:10:10:60 to polymerize a conductive polymer compound on the dielectric 2, thereby producing a solid electrolyte layer 3. Upon completion of this reaction, the non-reacted oxidant and excessive acid adhering to the anode 1 were washed away with water, and the anode 1 was dried in a vacuum state at 50° C. for 1 hour. A graphite layer 5 and a cathode electrode 6 constituted by a silver layer were sequentially formed on the solid electrolyte layer 3 consisting of the produced conductive polymer compound, thereby completing a capacitor. The electrical characteristics and heat resistance of the capacitor were measured. In the evaluation of the heat resistance, the capacitor was left in the air at 150° C., and a time required for setting an equivalent series resistance (ESR) at 100 kHz to be twice an initial value was measured.

Comparative Example 1

An anode on which an oxide coating identical to that of Example 1 was formed was dipped in a pyrrole solution containing pyrrole and ethanol at a weight ratio of 30:70. This anode was dipped in an oxidant solution set at a temperature of 15° C. and containing dodecylbenzene ferric sulfonate and ethanol at a weight ratio of 40:60 to polymerize a conductive polymer compound constituting a solid electrolyte layer on an oxide coating constituting a dielectric. Upon completion of this reaction, the non-reacted oxidant and excessive acid adhering to the anode were washed away with water, and the anode was dried in a vacuum state at 50° C. for 1 hour. A graphite layer and a silver layer constituting a cathode electrode were sequentially formed on the produced conductive polymer compound layer, thereby completing a capacitor. The electrical characteristics and heat resistance of the capacitor were measured.

Comparative Example 2

An anode on which an oxide coating identical to that of Example 1 was formed was dipped in an aniline solution containing aniline and ethanol at a weight ratio of 30:70. This anode was dipped in an oxidant solution set at a temperature of 15° C. and containing ammonium persulfate, toluenesulfonic acid, and ethanol at a weight ratio of 20:20:60 to polymerize a conductive polymer compound on the oxide coating. Upon completion of this reaction, the non-reacted oxidant and excessive acid were washed away with water, and the anode was dried in a vacuum state at 50° C. for 1 hour. A graphite layer and a silver layer were sequentially formed on the produced conductive polymer compound layer, thereby completing a capacitor. The electrical characteristics and heat resistance of the capacitor were measured.

EXAMPLE 2

A pyrrole-aniline solution mixture containing pyrrole, aniline, and ethanol at a weight ratio of 5:15:70 was mixed at an equi-molar ratio with an oxidant solution containing ammonium persulfate, toluenesulfonic acid, dodecylbenzene ferric sulfonate, and ethanol at a weight ratio of 20:10:10:60. The resultant solution mixture was kept at a temperature lower than a temperature at which a polymerization reaction progressed. A anode 1 on which a dielectric 2 constituted by a tantalum oxide coating was formed as in Example 1 was dipped in the solution mixture of the pyrrole-aniline solution mixture and the oxidant solution, and a polymerization reaction was caused to progress in an atmosphere at a predetermined temperature to form a solid electrolyte layer 3 consisting of a conductive polymer compound on the dielectric 2, thereby manufacturing a capacitor.

Since the conductivity and heat resistance of the capacitor arranged as described above depended on the solid electrolyte layer 3, the conductivity and heat resistance of the solid electrolyte layer 3 itself were evaluated as follows. The solution mixture of the pyrrole-aniline solution mixture and the oxidant solution was filtered by filter paper, The product on the filter paper was washed with water and dried in a vacuum state at 50° C. for 1 hour. Upon completion of the drying process, the product was molded into a pellet by a tablet molding machine. The obtained pellet consisting of a conductive polymer compound was measured by a three-terminal method. As in Example 1 and Comparative Examples 1 and 2, in order to evaluate the heat resistance of the pellet, the pellet was left in the air at 150° C., a time required for setting the conductivity of the pellet to be twice the initial value was measured.

Comparative Example 3

A pyrrole solution containing pyrrole and ethanol at a weight ratio of 30:70 was mixed at an equi-molar ratio with an oxidant solution containing dodecylbenzene ferric sulfonate and ethanol at a weight ratio of 40:60, and the same procedures as in Example 1 were performed. The conductivity and heat resistance of the resultant pellet were evaluated.

Comparative Example 4

A aniline solution containing aniline and ethanol at a weight ratio of 30:70 was mixed at an equi-molar ratio with an oxidant solution containing ammonium persulfate, toluenesulfonic acid, and ethanol at a weight ratio of 20:20:60, and the same procedures as in Example 1 were performed. The conductivity and heat resistance of the resultant pellet were evaluated.

The electrical characteristics and heat resistance of the capacitors manufactured in Example 1 and Comparative Examples 1 and 2 are shown in Table 1. The conductivities and heat resistances of the conductive polymer pellets manufactured in Example 2 and Comparative Examples 3 and 4 are shown in Table 2.

TABLE 1

| | Capacitance (μF) | ESR (mΩ) | Heat Resistance (time) |
|---|---|---|---|
| Example 1 | 9.7 | 200 | 150 |
| Comparative Example 1 | 9.5 | 150 | 14 |
| Comparative Example 2 | 9.6 | 400 | 170 |

Note: Each capacitance is obtained at 120 Hz, Each ESR is obtained at 100 kHz, and each heat resistance is a time required for setting the ESR to be twice the initial ESR.

TABLE 2

| | Conductivity (S/cm) | Heat Resistance (time) |
|---|---|---|
| Example 2 | 10.7 | 170 |
| Comparative Example 3 | 17.2 | 27 |
| Comparative Example 4 | 6.1 | 190 |

Referring to Tables 1 and 2, the heat resistance of the capacitor obtained in each of Examples 1 and 2 of the present invention is increased to a value 6 to 10 times the heat resistance of the capacitor obtained in each of Comparative Examples 1 and 3 in which a polymer compound consisting of only polypyrrole is used as a solid electrolyte. In addition, the conductivity of the pellet obtained in each of Examples 1 and 2 is increased to a value about twice the conductivity of the pellet obtained in each of Comparative Examples 2 and 4 in which a polymer compound consisting of only polyaniline is used as a solid electrolyte. That is, it is understand that each of Examples 1 and 2 has both the excellent properties of polypyrrole and polyaniline.

Note that, the following was confirmed in Examples 1 and 2. That is, when a chemical oxidation and polymerization process for producing a conductive polymer compound was repeated, the thickness of a solid electrolyte layer could be controlled by the number of repetition times of the chemical oxidation and polymerization process, so that the ESR and heat resistance of the solid electrolyte layer could be controlled.

In each of Examples 1 and 2, the anode 1 consisting of a tantalum sintered material is dipped in a pyrrole-aniline solution mixture. However, when the tantalum sintered material may be dipped in a solution mixture of soluble polypyrrole, a derivative thereof, polyaniline, and a derivative thereof, the same effect as described above can be obtained.

As has been described above, in a tantalum solid electrolytic capacitor according to the present invention, a conductive polymer compound obtained by doping a dopant in the copolymer or mixture of polypyrrole having a high conductivity or a derivative thereof and polyaniline having a high heat resistance or a derivative thereof is used as a solid electrolyte. For this reason, the solid electrolytic capacitor is excellent in high-frequency characteristics and heat resistance.

In the above solid electrolytic capacitor, the conductive polymer compound layer is formed by performing a chemical oxidation and polymerization process by the method described in each of Examples 1 and 2, and the chemical oxidation and polymerization process is repeated, thereby controlling the thickness of a conductive polymer compound layer to be a desired thickness. Therefore, the solid electrolytic capacitor can be manufactured with good reproducibility of the thickness of the solid electrolyte layer, i.e., good controllability of a conductivity and good reproducibility of heat resistance.

What is claimed is:
1. A solid electrolytic capacitor comprising:
   an anode consisting of a valve metal and having a lead extending therefrom;
   a dielectric layer constituted by an oxide coating formed by oxidizing a surface of said anode;
   a solid electrolyte layer formed on said dielectric layer; and
   a cathode electrode formed on said solid electrolyte layer,
   wherein said solid electrolyte layer consists of a conductive polymer compound obtained by doping a dopant in one of a copolymer and a mixture of polypyrrole or a derivative thereof, the polypyrrole having a repetition unit represented by a formula

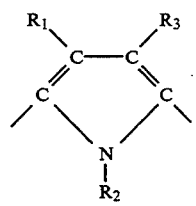

wherein each of $R_1$ to $R_3$ represents an alkyl group or a hydrogen atom, and polyaniline or a derivative thereof, the polyaniline having a repetition unit represented by a formula

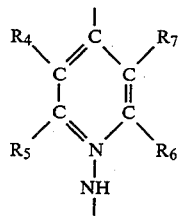

wherein each of $R_4$ to $R_7$ represents an alkyl group or a hydrogen atom.

2. A capacitor according to claim 1, wherein said solid electrolyte layer is constituted by a conductive polymer compound layer formed by a chemical oxidation and polymerization process, and said conductive polymer compound layer having a predetermined thickness is formed by repeatedly performing the chemical oxidation and polymerization process.

3. A capacitor according to claim 1, wherein the anode having said dielectric layer formed on a surface thereof is dipped in a solution mixture of pyrrole and aniline and then dipped in an oxidant solution, thereby forming said solid electrolyte layer.

4. A capacitor according to claim 1, wherein, after said anode having said dielectric layer formed on a surface thereof is dipped in a solution mixture which is obtained by mixing a solution mixture of pyrrole and aniline with an oxidant solution and has a temperature kept lower than a temperature at which a polymerization reaction progresses, the polymerization reaction is caused to progress in an atmosphere at a predetermined temperature, thereby forming the solid electrolyte layer.

5. A capacitor according to claim 1, wherein said anode consists of a tantalum sintered body formed by sintering a tantalum powder, and said dielectric layer is constituted by a tantalum oxide coating formed on said tantalum sintered body by anodizing said tantalum sintered body.

* * * * *

UNITED STATES PATENT AND TRADEMARK OFFICE
CERTIFICATE OF CORRECTION

PATENT NO. : 5,428,500
DATED : June 27, 1995
INVENTOR(S) : Toshihiko Nishiyama, et. al.

It is certified that error appears in the above-indentified patent and that said Letters Patent is hereby corrected as shown below:

Column 4, line 42, delete "5" and insert --15--.

Signed and Sealed this

Thirtieth Day of July, 1996

Attest:

BRUCE LEHMAN

Attesting Officer     Commissioner of Patents and Trademarks